Dec. 15, 1953   E. A. ROWE ET AL   2,662,552
RIVER WEIGHT FOR PIPE LINES
Filed Oct. 6, 1952   4 Sheets-Sheet 1
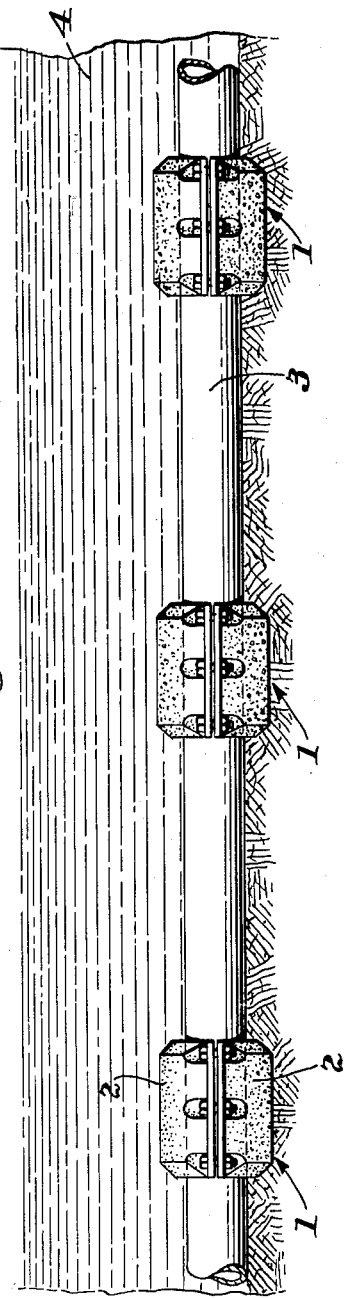
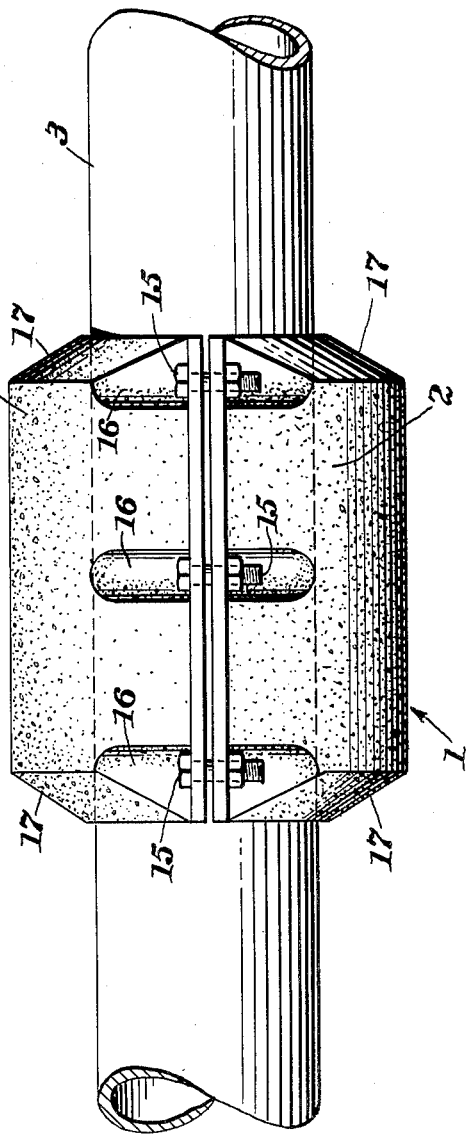
INVENTORS:
*Edgar A. Rowe,*
*Raymond M. Zschau,*
BY *Cushman, Darby & Cushman*
ATTORNEYS.

Dec. 15, 1953    E. A. ROWE ET AL    2,662,552
RIVER WEIGHT FOR PIPE LINES
Filed Oct. 6, 1952    4 Sheets-Sheet 2
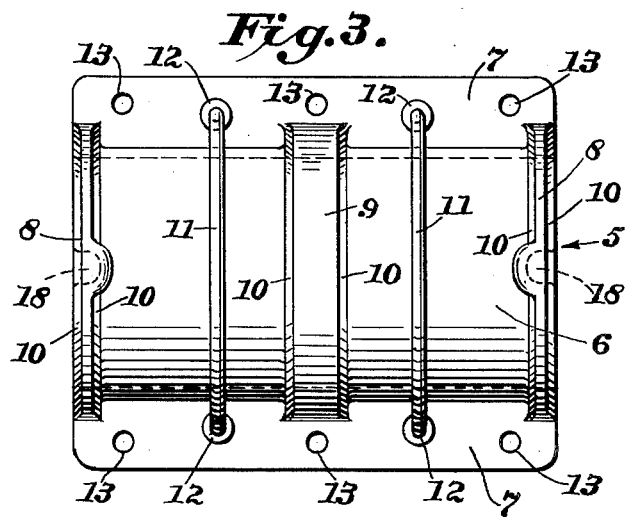
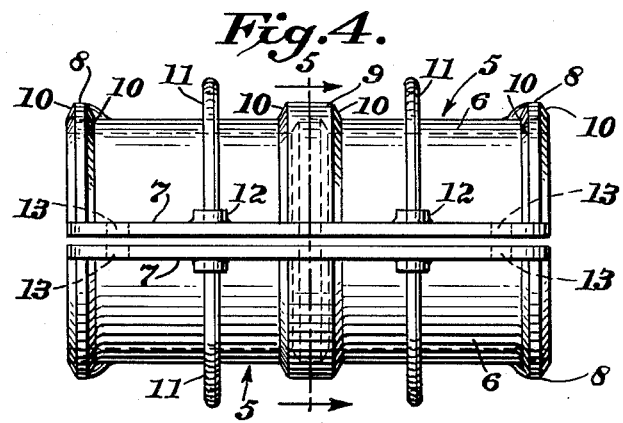
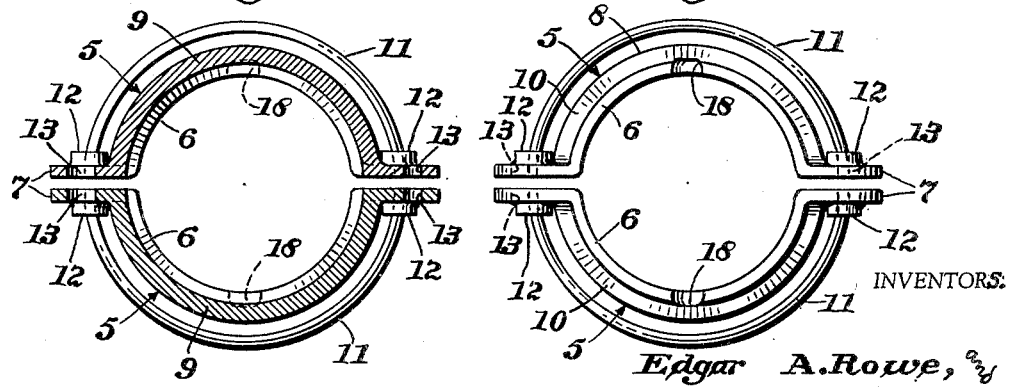
INVENTORS:
Edgar A. Rowe,
Raymond M. Zschau,
BY Cushman, Darby & Cushman
ATTORNEY Dec. 15, 1953   E. A. ROWE ET AL   2,662,552
RIVER WEIGHT FOR PIPE LINES
Filed Oct. 6, 1952   4 Sheets-Sheet 3

INVENTORS:
Edgar A. Rowe,
Raymond M. Zschau,
BY Cushman, Darby & Cushman
ATTORNEYS.

Dec. 15, 1953   E. A. ROWE ET AL   2,662,552
RIVER WEIGHT FOR PIPE LINES
Filed Oct. 6, 1952   4 Sheets-Sheet 4
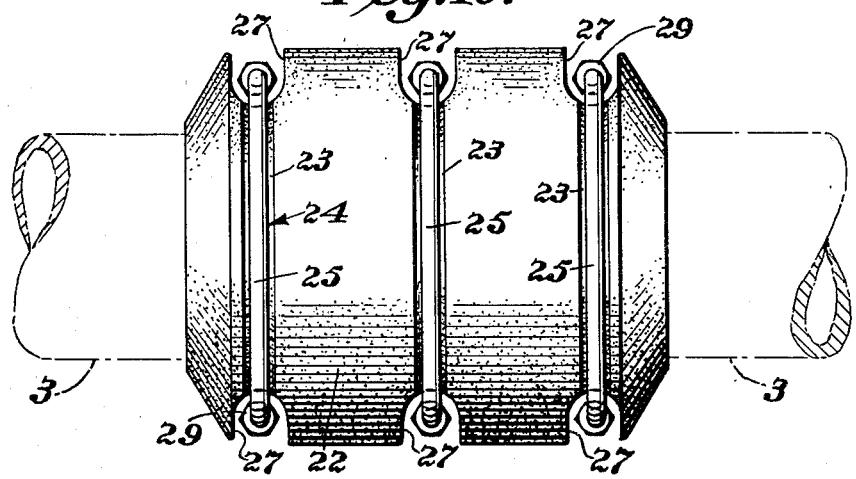
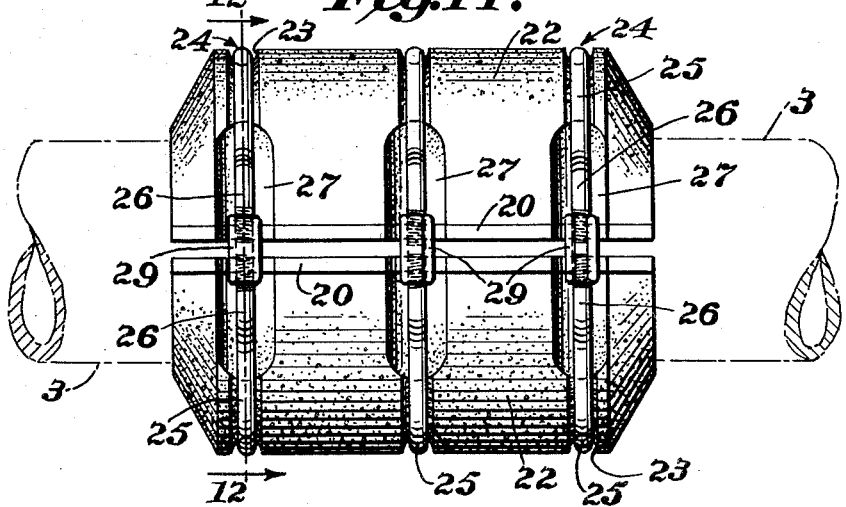
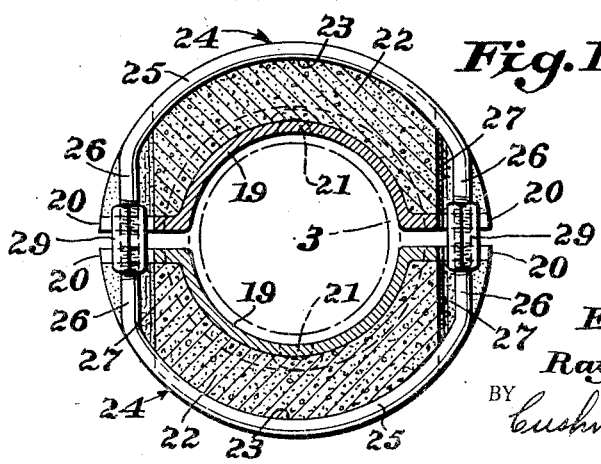
INVENTORS.
Edgar A. Rowe,
Raymond M. Zschau,
BY Cushman, Darby & Cushman
ATTORNEYS.

Patented Dec. 15, 1953

2,662,552

UNITED STATES PATENT OFFICE 2,662,552

RIVER WEIGHT FOR PIPE LINES

Edgar A. Rowe and Raymond M. Zschau, Martinsville, Ill.

Application October 6, 1952, Serial No. 313,274

3 Claims. (Cl. 138—25)

This invention relates to weights of the type used to anchor conduits such as pipe lines in the bottom of rivers or other bodies of water and more particularly to a weight having a metal base portion with a superposed layer of concrete or the like. Weights of this type are generally known as "river weights."

In the laying of pipe lines, such as those used for the transmission of oil or natural gas, it is necessary to provide means for weighing down or anchoring such pipe lines or conduits wherever they cross a body of water such as a river, stream, or like. A weight used for this purpose must be structurally strong, easy to position on the pipe line or conduit with which it is being used, and should also be provided with means to facilitate handling of the weight by lifting devices customarily used in moving such articles. It is also important that the weight members be economical to manufacture.

Accordingly, it is an object of our invention to provide a new and improved river weight which has great structural strength and yet is economical to manufacture.

It is a further object of this invention to provide a river weight having integral therewith means which cooperate with a lifting apparatus to facilitate lifting and moving of the weight.

In accordance with these objects, this invention provides a river weight having a metal base portion adapted to reinforce an outer layer of concrete or the like, with recess means being provided at the ends of the metal base portion which cooperate with lifting hooks used in conjunction with a lifting apparatus.

The features of this invention which we believe to be novel are set forth with particularity in the appended claims. Our invention itself, however, both as to its organization and use, together with further objectives and advantages thereof, may best be understood by reference to the following description taken in connection with the accompanying drawings in which:

Figure 1 is a front elevation view of a plurality of our river weights as they appear in position on a pipe line beneath a body of water;

Figure 2 is an enlarged view in longitudinal elevation of one of the river weights of Figure 1;

Figure 3 is a top plan view of the metal base portion of the river weight of Figure 2;

Figure 4 is a longitudinal elevation of the metal base portion of Figure 3;

Figure 5 is a view in cross-section along line 5—5 of Figure 4;

Figure 6 is an end view of the metal base portion of Figures 3 and 4;

Figure 10 is a plan view of a modified form of river weight using external U bolts to reinforce the weight;

Figure 11 is a longitudinal elevation of Figure 10, and

Figure 12 is a transverse sectional view along line 12—12 of Figure 11.

Figure 7:
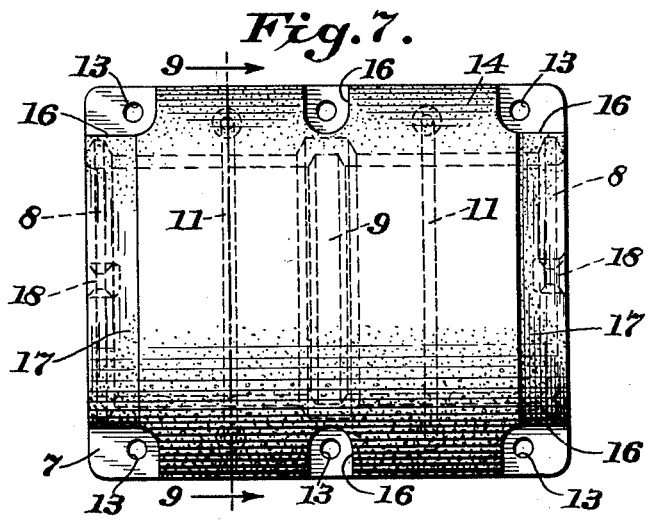
Figure 7 is a top plan view of a completed river weight after being coated with concrete.

Referring now to the drawings, and more particularly to Figures 1–9, it will be seen that each of our river weights, generally designated as 1, comprises a pair of similar substantially semi-cylindrical members 2 each of which has a hollow interior which permits the members 2 to embrace the outer periphery of the pipe line 3. Each of the members 2 extends for slightly less than 180 degrees of the periphery of the pipe line to permit a slight displacement of the adjoining faces of the oppositely disposed members. Each pair of members 2 is bolted or otherwise detachably held together in such manner as to substantially completely encircle the pipe line or conduit 3. A plurality of similar river weight members 1, each comprising a pair of mating members 2, are positioned along the pipe line at suitably displaced positions in order to effectively hold the pipe line down on the bottom of the body of water 4.

As will best be seen in Figures 3–6, inclusive, each of the river weights comprises a pair of flanged hollow substantially semi-cylindrical metal base members 5. The metal base members may be made of any suitable metallic material such as, for example, cast iron, steel, or malleable iron. Each of the metal base members 5 has a hollow semi-cylindrical portion 6 having an inner diameter slightly greater than the outer diameter of the pipe line with which the members 5 are being used and preferably extending for slightly less than 180 degrees of the circumference of the pipe line. Each of the metal base members 5 is also provided with a pair of oppositely disposed flange members 7 which lie in substantially the same plane as each other and are positioned substantially perpendicularly to the periphery of the semi-cylindrical portion 6.

In order to reinforce the coating of concrete or other similar material which covers the outer periphery of the metal base member, the metal base member 5 is provided with metal reinforcing rib members 8 which are disposed at opposite ends of the base member and a rib member 9 which is disposed substantially midway of the length of the base member 5. The rib members 8 and 9 are integral with the base member 5, with the intermediately disposed rib member 9 preferably having a substantially greater dimension along the longitudinal axis of the base member than the corresponding dimensions of either of the rib members 8. The rib members 8 and 9 are provided with bevelled side surfaces 10 as indicated in the drawings. The rib member 9 may be recessed on its undersurface as shown in dotted outline in Figure 4, in order to avoid too great a concentration of metal in the region of rib member 9.

As a further means of reinforcing the layer of concrete which is applied on the surface of the metal base member 5, we provide a pair of substantially semi-circular metal rod members 11 having heads 12 which preferably are cast into the flange portions 7. The rod members 11 are bent to a radius greater than the radius of the semi-cylindrical base portions 6 so that the rods 11 are spaced radially outwardly of the outer surface of portion 6. One of the rod members 11 is positioned intermediately of the rib members 8 and 9 on the right-hand side of the base member 5, with respect to the view shown in the drawing, while the other rod member 11 is similarly positioned on the left-hand side of each of the base members. Each of the flange members 7 is provided with a plurality of apertures 13 for receiving the bolt member or other fastening means used to hold a pair of the members 2 together.

Figure 8:
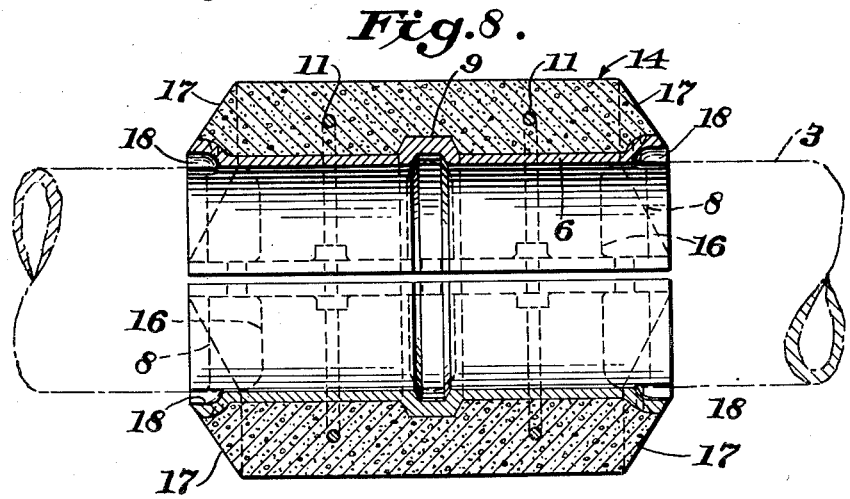
Figure 8 is a longitudinal sectional view of the river weight of Figure 7.
Figure 9:
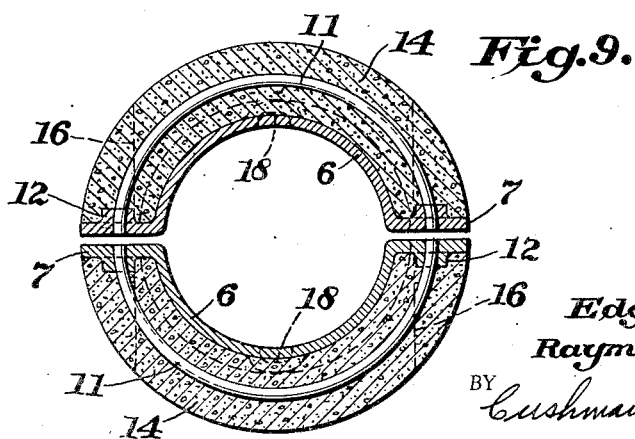
Figure 9 is a transverse sectional view along line 9—9 of Figure 7.

As can best be seen in Figures 7, 8, and 9, a relatively heavy layer of concrete or other similar material 14 is superposed on each of the metal base members 5 for the entire length thereof, with the concrete layer being of sufficient radial thickness to completely cover the rib members 8 and 9 and also to cover the rod members 11. The concrete coating is of substantially uniform thickness and preferably extends to the outer edges of the flanges 7. In order to facilitate positioning of bolt members 15, each of the semi-cylindrical river weight elements 2 is provided with pocket-like portions 16 where no concrete is present, as will best be seen in Figure 2. The pocket portions 16 preferably extend flush with the outer surface of each of the respective flange members 7, and are of sufficient width and depth to permit easy positioning of the bolts 15.

In order to reduce resistance of the river weight to motion through water or through obstructions in water or ditches when the pipe line section is being moved into position, the ends of the concrete layers 14 are preferably made frusto-conical in shape as indicated at 17.

To facilitate lifting of the river weight members 2, each of the metal base members 5 is provided at the inner surface of each of its respective opposite ends with a recess 18, as may best be seen in Figures 5-9 inclusive. The recess 18 is molded directly into the respective opposite ends of the metal base member 5. When the semi-cylindrical river weight elements 2 are being moved from one place to another, hook members may be engaged with the recesses 18 to permit easy lifting of the river weight.

It will be seen that in using the river weights described in connection with Figures 1-9, a pair of similar river weight members 2 are placed in position around a pipe line section so that the two mating semi-cylindrical members together substantially surround the outer periphery of the pipe line. The two members 2 are aligned in mating relationship with each other with the respective apertures 13 of the upper and lower members in registration, so that the oppositely disposed flanges 7 may be bolted together to hold a given pair of members 2 in place about the pipe line.

There is shown in Figures 10-12, inclusive, a modified form of our invention in which metal reinforcing rods are used on the exterior surface of the concrete layer, either in addition to or in place of the ribs 8 and 9 and reinforcing rods 11 of the embodiment of Figures 1-9. The modified river weight members shown in Figures 10-12, inclusive, are provided with a metal base member 19 having a hollow substantially semi-cylindrical center portion adapted to embrace the outer periphery of the pipe line, and flanges 20 which extend substantially perpendicularly to the periphery of the substantially semi-cylindrical center portion.

In this form of our invention the integral metal rib members 8 and 9, and the rod members 11 may be omitted, and the metal base portion 19 as seen in Figure 12 may be smooth in contour. Each of the respective opposite ends of each of the metal base members 19 may be provided with a recess 21 for the reception of lifting hooks. A layer 22 of concrete is applied over the metal base member 19, extending for substantially the entire longitudinal dimension thereof, and being of sufficient radial thickness to extend to the outer edges of the flange members 20. The outer periphery of the concrete layer 22 is provided with grooves 23 for the reception of rod members 24 which may have substantially the shape of U-bolts. Each of the rod members 24 is provided with an arcuate portion 25 which lies in the grooved portion 23 of the cement layer. Each of the respective opposite ends of rod members 24 is bent into a straight portion 26 which extends substantially perpendicularly to the flange members 20.

The concrete layer 22 is provided with pockets 27 to receive the straight portions 26 of the rod members 24. The outer end of each of the straight portions 26 is threaded, and a turnbuckle 29 or other similar fastening means is provided to draw together the respective aligned ends of the rods 24 to permit tightening of each pair of mating river weight members in position about the pipe line. The flange members 20 are provided with suitable apertures for the reception of the threaded ends of rod portions 26 and also for the reception of the turnbuckle 29. These apertures may be open at the outer edges of the flanges 20 to facilitate positioning of the turnbuckle or other tightening means. The two aligned straight portions 26 which are joined by a given turnbuckle should be threaded in opposite directions to permit tightening of the turnbuckle. The concrete layer at each of the respective opposite ends of each river weight member should be bevelled in such manner as to make the ends frusto-conical in shape to facilitate movement of the river weight possible through water or through obstructions in water or ditches.

From the foregoing it can be seen that we have provided in accordance with our invention a new and improved river weight having a metal base portion with a superposed layer of concrete, with suitable means being provided to reinforce the combined metal base and concrete overlay. The river weight which we have provided in accordance with our invention has far greater structural strength than a river weight formed of concrete alone and yet is much more economical to manufacture than a river weight formed entirely of metal. Furthermore, we have provided our river weight members with a new and improved structure to facilitate lifting of the weights.

While there have been shown and described particular embodiments of our invention, it will be obvious to those skilled in the art that various changes and modifications can be made therein without departing from the invention and, therefore, it is intended in the appended claims to cover all such changes and modifications as fall within the true spirit and scope of the invention.

We claim:

1. A river weight for anchoring a conduit in a body of water, said weight comprising a hollow substantially semi-cylindrical metal base member which embraces the outer periphery of said conduit, said base member having a pair of oppositely disposed flanges extending substantially perpendicularly to the outer periphery of said base member, at least one generally semi-circular metal reinforcing rod having the outer ends thereof rigidly attached substantially perpendicularly to said respective oppositely disposed flange members, said reinforcing rod being provided with an arcuate portion which is spaced radially outwardly of the outer periphery of said metal base member, said reinforcing rod and said metal base member being covered with concrete.

2. A river weight as defined in claim 1 in which said metal base member is provided with at least one circumferentially extending metal rib member integral with said metal base member for substantially the entire length of said rib member and extending radially outwardly from the outer periphery of said base member, said rib member and said reinforcing rod being covered by said concrete.

3. A river weight for anchoring a conduit in a body of water, said weight comprising a pair of hollow substantially semi-cylindrical members adapted to embrace the outer periphery of said conduit, said pair of members together substantially completely surrounding said conduit, each of said members comprising a hollow substantially semi-cylindrical metal base member, each of said metal base members being provided with a pair of oppositely-disposed flange members, a layer of concrete superposed on each of said respective metal base members including said flange members, at least one generally U-shaped rod member surrounding the outer surface of the concrete layer on each of said semi-cylindrical members, each of said U-shaped rod members having a pair of free ends in alignment with a pair of corresponding free ends of a U-shaped rod member for the other of said semi-cylindrical members, and means for fastening each free end of one U-shaped rod member with the free end of the other rod member with which it is aligned to hold said pair of semi-cylindrical members together in assembled relation.

EDGAR A. ROWE.
RAYMOND M. ZSCHAU.

References Cited in the file of this patent

UNITED STATES PATENTS

| Number | Name | Date |
|---|---|---|
| 868,785 | Johnson | Oct. 22, 1907 |
| 2,185,749 | Kennedy | Jan. 2, 1940 |
| 2,373,439 | Wheatley | Apr. 10, 1945 |
| 2,518,981 | Edwards | Aug. 15, 1950 |